US011513485B2

(12) United States Patent
Guo et al.

(10) Patent No.: US 11,513,485 B2
(45) Date of Patent: Nov. 29, 2022

(54) STABILITY REGION DETERMINING METHOD FOR DISTRIBUTED POWER CYBER-PHYSICAL SYSTEM WITH MULTIPLE TIME DELAYS

(71) Applicant: Tsinghua University, Beijing (CN)

(72) Inventors: Qinglai Guo, Beijing (CN); Hongbin Sun, Beijing (CN); Luo Xu, Beijing (CN); Wenchuan Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/328,270

(22) Filed: May 24, 2021

(65) Prior Publication Data
US 2022/0244687 A1 Aug. 4, 2022

(30) Foreign Application Priority Data

Jan. 29, 2021 (CN) .......................... 202110129875.1

(51) Int. Cl.
*G05B 17/02* (2006.01)
(52) U.S. Cl.
CPC .................................... *G05B 17/02* (2013.01)
(58) Field of Classification Search
CPC ....................................................... G05B 17/02
See application file for complete search history.

(56) References Cited

FOREIGN PATENT DOCUMENTS

CN         106294892 A  *  1/2017

OTHER PUBLICATIONS

Khalil et al., An Accurate Method for Delay Margin Computation for Power System Stability; Energies article, Oct. 7, 2018 (Year: 2018).*
Luo Xu, Modeling of Time-Delayed Distributed CyberPhysical Power Systems for Small-Signal Stability Analysis, IEEE publication, 2021 (Year: 2021).*
CNIPA, Office Action issued for CN Application No. 202110129875. 1, dated Nov. 8, 2021.
Xu, et al., "Modeling of Time-Delayed Distributed Cyber-Physical Power Systems for Small-Signal Stability Analysis", IEEE Transactions on Smart Grid, vol. 12, Issue 4, pp. 3425-3437, Jan. 18, 2021.

* cited by examiner

*Primary Examiner* — Chad G Erdman
(74) *Attorney, Agent, or Firm* — Hodgson Russ LLP

(57) ABSTRACT

The present disclosure provides a stable region determining method for distributed cyber-physical power systems with multiple time delays, including: first establishing a state space expression of the cyber-physical power systems under distributed control with multiple time delays; converting the state space expression to frequency domain through Laplace transform to obtain a characteristic equation for multiple time delays of the cyber-physical power systems under distributed control, and establishing a marginally stable characteristic equation with unified time delay to obtain a marginally stable characteristic equation for multiple time delays of the cyber-physical power systems under distributed control with unified time delay; in each time delay direction, solving a stable boundary for time delay of the cyber-physical power systems under distributed control; connecting the stable boundaries for time delays in all time delay directions, and generating a stable domain for time delays of the cyber-physical power systems under distributed control.

1 Claim, No Drawings

STABILITY REGION DETERMINING METHOD FOR DISTRIBUTED POWER CYBER-PHYSICAL SYSTEM WITH MULTIPLE TIME DELAYS

FIELD

The present disclosure relates to a field of cyber-physical power systems, and more particularly to a stable region determining method for distributed cyber-physical power systems with multiple time delays.

BACKGROUND

Cyber-physical systems are complex systems constructing physical spaces and cyber spaces which are mapped each other and efficiently cooperated through advanced technologies such as perception, calculation, communication and control. In the field of smart grid technologies, modern smart grids have been widely regarded as a kind of cyber-physical power systems due to physical power systems relying on many advanced information technology manners. Distributed architecture has higher requirements for real-time communication than centralized architecture. The cyber-physical power systems under distributed control may be regarded as a kind of distributed cyber-physical power systems. The distributed architecture has a wide application prospect in modern and future power systems. A physical side of the power systems is also more dependent on distributed cyber architecture.

Compared with centralized control models having relatively simple time delays, the distributed cyber-physical power systems have time delays in many links such as measurement, communication with one another and control. A large number of practical applications have proved that these time delays may affect stability of the systems. For example, when the time delays are large, it may influence an effect of distributed frequency control and cause the systems to lose stability. In this context, characterizing a stable region for time delays of the distributed cyber-physical power systems may help the systems to control the time delay in the stable region during planning, design, and operation to prevent the systems from losing stability. Existing technical means are mainly oriented to the stability for time delay of relatively simple centralized or local cyber-physical power systems, for example, Pade approximation and other frequency domain methods are used to analyze an influence of time delays of power system stabilizers (PSS) on the stability of the systems, and have low efficiency. However, how to efficiently solve and characterize the stable region of the distributed cyber-physical power systems with multiple time delays is still a key issue that requires to be solved urgently.

SUMMARY

The present disclosure seeks to solve the problems existing in the related art, and provides a stable region determining method for distributed cyber-physical power systems with multiple time delays. The present disclosure is oriented to the stability for time delay of the cyber-physical power systems under distributed control, and may determine whether the cyber-physical power systems will be unstable under a specific time delay. The method of the present disclosure may be applied to architecture design, communication networking and formulation of communication requirements of the power system under distributed control, and may clarify an influence of the distributed control on the stability of the cyber-physical power systems under different time delays.

The present disclosure provides the stable region determining method for the distributed cyber-physical power systems with multiple time delays. The method includes: first establishing a state space expression of the cyber-physical power systems under distributed control with multiple time delays; converting the state space expression to frequency domain through Laplace transform to obtain a characteristic equation for multiple time delays of the cyber-physical power systems under distributed control, and establishing a marginally stable characteristic equation with unified time delay to obtaining a marginally stable characteristic equation for multiple time delays of the cyber-physical power systems under distributed control with unified time delay; in each time delay direction, solving a stable boundary for time delay of the cyber-physical power systems under distributed control; connecting the stable boundaries for time delays in all time delay directions, and finally generating a stable domain for time delays of the cyber-physical power systems under distributed control with multiple time delays.

The method includes:

1) establishing the state space expression of the cyber-physical power systems under distributed control with multiple time delays:

$$\dot{x}=A_0x(t)+A_Mx(t-\tau_m)+A_Cx(t-\tau_c)+A_Ex(t-\tau_e) \quad (8)$$

where x(t) denotes a state variable of the cyber-physical power systems at time point t, $\dot{x}(t)$ denotes a differential variable of x(t), $x(t-\tau_m)$ denotes a state variable of the cyber-physical power systems with measurement time delay at time point $t-\tau_m$, $x(t-\tau_c)$ denotes a state variable of the cyber-physical power systems with communication time delay at time point $t-\tau_c$, $x(t-\tau_e)$ denotes a state variable of the cyber-physical power systems with control time delay at time point $t-\tau_e$, $\tau_m$ denotes the measuring time delay of the distributed control of a cyber side, $\tau_c$ denotes the communication time delay of the distributed control of the cyber side, $\tau_e$ denotes the control time delay of the distributed control of the cyber side, $A_0$ denotes a state transition matrix of the cyber-physical power systems in a normal state, $A_M$ denotes a transition matrix of the variable of the measurement time delay of the cyber-physical power systems, $A_C$ denotes a transition matrix of the variable of the communication time delay of the cyber-physical power systems, $A_E$ denotes a transition matrix of the variable of the control time delay of the cyber-physical power systems;

2) establishing the marginally stable characteristic equation for multiple time delays of the cyber-physical power systems under distributed control, which includes:

2.1) solving Laplace form of Formula (1):

$$sX=A_0X+A_MXe^{-s\tau_m}+A_CXe^{-s\tau_c}+A_EXe^{-s\tau_e} \quad (9)$$

where s denotes a Laplace operator, X denotes x(t) in the frequency domain, e denotes a natural exponential;

2.2) establishing the characteristic equation for multiple time delays of the cyber-physical power systems under distributed control:

$$\det(\lambda I-A_0-A_Me^{-\lambda\tau_m}-A_Ce^{-\lambda\tau_c}-A_Ee^{-\lambda\tau_e})=0 \quad (10)$$

where det denotes the characteristic equation, $\lambda$ denotes a characteristic value of the characteristic equation, I denotes an identity matrix having a same dimension as $A_0$;

2.3) establishing the marginally stable characteristic equation with unified time delay of the cyber-physical power systems under distributed control, which includes:

2-3-1) establishing an expression of a normalized time delay direction vector, which satisfies:

$$d=(\tau_m, \tau_e, \tau_c)/\|(\tau_m, \tau_e, \tau_c)\|=(d_m d_e, d_c) \quad (11)$$

where $\|\cdot\|$ denotes 2 norm, $d_m$ denotes a proportion of the measurement time delay in the direction vector, $d_e$ denotes a proportion of the control time delay in the direction vector, $d_c$ denotes a proportion of the communication time delay in the direction vector;

2-3-2) constructing the marginally stable characteristic equation by substituting $\lambda$ in Formula (3) with $j\omega_d$:

$$\det(j\omega_d I - A_0 - A_M e^{-j\omega_d \tau_m^{mar}} - A_C e^{-j\omega_d \tau_c^{mar}} - A_E e^{-j\omega_d \tau_e^{mar}}) = 0 \quad (12)$$

where j denotes a symbol of imaginary number, $\omega_d$ denotes an amplitude of an imaginary part of a rightmost characteristic value of the cyber-physical power systems under distributed control in the marginally stable state, $\tau_m^{mar}$, $\tau_c^{mar}$, $\tau_e^{mar}$ respectively denote a boundary for the measurement time delay, a boundary for the communication time delay and a boundary for the control time delay;

2-3-3) establishing the marginally stable characteristic equation with unified time delay:

$$\det(j\omega_d I - A_0 - A_M e^{-j\theta_d d_m} - A_C e^{-j\theta_d d_c} - A_E e^{-j\theta_d d_e}) = 0 \quad (13)$$

where $\theta_d$ denotes the unified time delay, $\omega_d \tau_m^{mar}$ is equal to $\theta_d d_m$, $\omega_d \tau_c^{mar}$ is equal to $\theta_d d_c$, $\omega_d \tau_e^{mar}$ is equal to $\theta_d d_e$;

3) solving a stable delay boundary of the cyber-physical power systems under distributed control, which includes:

3-1) setting a direction counter to be p=1 and a total number of the directions to be P, and taking a direction corresponding to p=1 as a present time delay direction;

3-2) performing initialization, which includes:
determining the normalized time delay direction vector d corresponding to the present time delay direction, setting a minimum unified time delay to be $\theta_{min}=0$, setting a maximum unified time delay to be $\theta_{max}=\min(2\pi/d_m, 2\pi/d_c, 2\pi/d_e)$, setting an outer iteration unified time delay to be $\theta=\theta_{min}$, setting an inner iteration unified time delay to be $\tilde{\theta}=\theta_{min}$, setting a convergence threshold $\varepsilon$ and an iteration counter as k=1, selecting the number N of intervals for time delay and the interval for time delay as $\Delta\theta=(\theta_{max}-\theta_{min})/N$;

3-3) determining a minimum unstable time delay of the present time delay direction, which includes:

3-3-1) determining whether k is less than N; going to block 3-3-2) in response to k being less than N; otherwise, determining that all points in this direction are within the stable region of the systems, and taking a maximum value in a coordinate range of the present time delay direction as a stable boundary for time delay in the present time delay direction, and then entering block 3-4-4);

3-3-2) setting $\theta_d$ in Formula (6) to be $\tilde{\theta}$, and solving Formula (6) to obtain the rightmost characteristic value of the interval $\tilde{\lambda}_r$;

3-3-3) determining whether a real part of $\tilde{\lambda}_r$ being less than 0, in response to the real part of $\tilde{\lambda}_r$ being less than 0, setting $\tilde{\theta}=\tilde{\theta}+\Delta\theta$, k=k+1, and then returning to block 3-3-1); otherwise, setting $\theta_{max}=\tilde{\theta}$, and then entering block 3-4);

3-4) solving the stable boundary $(\tau_m^{mar}, \tau_e^{mar}, \tau_c^{mar})$ for time delay in the present time delay direction, which includes:

3-4-1) setting $\theta_d$ in Formula (6) to be $\theta$, and solving Formula (6) to obtain a critical characteristic value $\lambda_r$;

3-4-2) determining whether a real part of the critical characteristic value $\lambda_r$ being less than the convergence threshold $\varepsilon$, in response to the real part of the critical characteristic value $\tilde{\lambda}_r$ being less than the convergence threshold $\varepsilon$, going to block 3-4-3); otherwise, going to block 3-4-4);

3-4-3) setting $\theta_d=\theta$, $\omega_d=\text{Im}(\lambda_r)$, where $\text{Im}(\lambda_r)$ denotes amplitude of an imaginary part of $\lambda_r$;

solving the stable boundary for time delay in the present time delay direction as:

$$(\tau_m^{mar}, \tau_e^{mar}, \tau_c^{mar}) = (\theta_d/\omega_d) d \quad (14)$$

completing solving of the stable boundary for time delay in the present time delay direction;

3-4-4) determining whether p is less than P, in response to p being less than P, setting p=p+1, and updating the present time delay direction and then returning to block 3-2); otherwise, completing solving of the stable boundaries for time delays in all time delay directions, and going to block 4);

3-4-5) determining whether the real part of $\lambda_r$ being less 0, in response to the real part of $\lambda_r$ being less 0, setting $\theta_{min}=\theta$, and updating $\theta=(\theta_{min}+\theta_{max})/2$; otherwise, setting $\theta_{max}=\theta$, and updating $\theta=(\theta_{min}+\theta_{max})/2$;
then returning block 3-4-1);

4) determining the stable region;
in which, the stable boundaries $(\tau_m^{mar}, \tau_e^{mar}, \tau_c^{mar})$ for time delays in all time delay directions are connected, and an inside of a high-dimensional polyhedron enclosed by the stable boundaries is the stable region for time delays of the cyber-physical power systems under distributed control with multiple time delays.

Characteristics and beneficial effects of the present disclosure are:

The present disclosure provides the stable region determining method for the distributed cyber-physical power systems with multiple time delays. The method of the present disclosure may be applied to a stability criterion of the cyber-physical power systems under distributed control with multiple time delays, may be used for design and optimization of communication architecture of the distributed cyber-physical power systems, and improve the stability of the distributed cyber-physical power systems.

DETAILED DESCRIPTION

The present disclosure provides a stable region determining method for distributed cyber-physical power systems with multiple time delays. The following will further explain in combination with specific embodiments.

The present disclosure provides the stable region determining method for the distributed cyber-physical power systems with multiple time delays. The method includes: first establishing a state space expression of the cyber-physical power systems under distributed control with multiple time delays; converting the state space expression to frequency domain through Laplace transform to obtain a characteristic equation for multiple time delays of the cyber-physical power systems under distributed control, and establishing a marginally stable characteristic equation with unified time delay to obtaining a marginally stable characteristic equation for multiple time delays of the cyber-physical power systems under distributed control with unified time delay; then determining a minimum unstable time delay by dividing time delay intervals, and in each time delay direction, solving a stable boundary for time delay of the cyber-physical power systems under distributed control; connecting the stable boundaries for time delays in all time delay directions, and finally generating a stable domain for time delays of the cyber-physical power systems under distributed control with multiple time delays.

The method specifically includes the following blocks.

1) The state space expression of the cyber-physical power systems under distributed control with multiple time delays is established as follows.

$$\dot{x}(t)=A_0 x(t)+A_M x(t-\tau_m)+A_C x(t-\tau_c)+A_E x(t-\tau_e) \quad (15)$$

where x(t) denotes a state variable of the cyber-physical power systems at time point t (for example, phase angle of a node, frequency of the node, voltage of the node, etc., the state variables may be selected one or more types from which for describing a machine-electricity transient model of a physical system), $\dot{x}(t)$ denotes a differential variable of x(t), namely, $\dot{x}(t)=dx(t)/dt$, $x(t-\tau_m)$ denotes a state variable of the cyber-physical power systems with measurement time delay at time point $t-\tau_m$ (for example, a measured frequency of the node, a measured voltage of the node and other values at time point $t-\tau_m$, configured for distributed iterative calculation), $x(t-\tau_c)$ denotes a state variable of the cyber-physical power systems with communication time delay at time point $t-\tau_c$ (a variable that requires communication calculation in the distributed iterative calculation, such as a tiny increasing rate of a generator for the distributed iterative calculation), $x(t-\tau_e)$ denotes a state variable of the cyber-physical power systems withe control time delay at time point $t-\sigma_e$ (control variables obtained after performing the distributed iterative calculation, such as an active power output of a generator node, a preset voltage value of the generator node, etc.), $\tau_m$ denotes the measurement time delay of the distributed control of a cyber side, $\tau_c$ denotes the communication time delay of the distributed control of the cyber side, $\tau_e$ denotes the control time delay of the distributed control of the cyber side, $A_0$ denotes a state transition matrix of the cyber-physical power systems in a normal state, depending on parameters of the physical side of the systems, $A_M$ denotes a transition matrix of the variable of the measurement time delay of the cyber-physical power systems, depending on settings of a measuring unit, $A_C$ denotes a transition matrix of the variable of the communication time delay of the cyber-physical power systems, depending on a distributed control algorithm and communication strategy of neighboring nodes, $A_E$ denotes a transition matrix of the variable of the control time delay of the cyber-physical power systems, depending on settings of a control unit. (The above matrix may separate variables with different time delays and without time delay by listing and establishing simultaneous differential algebraic equations of the cyber-physical power systems to obtain the corresponding transition matrix)

2) The marginally stable characteristic equation for multiple time delays of the cyber-physical power systems under distributed control is established. The block specifically includes the following.

2.1) The state space expression of the cyber-physical power systems under distributed control, that is, Laplace form of Formula (1), is solved.

$$sX=A_0 X+A_M X e^{-s\tau_m}+A_C X e^{-s\tau_c}+A_E X e^{-s\tau_e} \quad (16)$$

where s denotes a Laplace operator, X denotes x(t) in the frequency domain, e denotes a natural exponential.

2.2) The characteristic equation for multiple time delays of the cyber-physical power systems under distributed control is established.

$$\det(\lambda I - A_0 - A_M e^{-\lambda \tau_m} - A_C e^{-\lambda \tau_c} - A_E e^{-\lambda \tau_e})=0 \quad (17)$$

where det denotes the characteristic equation, $\lambda$ denotes a characteristic value of the characteristic equation, I denotes an identity matrix having a same dimension as $A_0$.

2.3) The marginally stable characteristic equation with unified time delay of the cyber-physical power systems under distributed control is established. The block specifically includes the following.

2-3-1) An expression of a normalized time delay direction vector is established, which satisfies:

$$d=(\tau_m, \tau_e, \tau_c)/\|(\tau_m, \tau_e, \tau_c)\|=(d_m, d_e, d_c) \quad (18)$$

where $\|\cdot\|$ denotes 2 norm, $d_m$, $d_e$, $d_c$ respectively denote a proportion of the measurement time delay in the direction vector, a proportion of the control time delay in the direction vector, and a proportion of the communication time delay in the direction vector. A sum of the three proportions is 1.

2-3-2) The marginally stable characteristic equation is constructed by substituting $\lambda$ in Formula (3) with $j\omega_d$.

$$\det(j\omega_d I - A_0 - A_M e^{-j\omega_d \tau_m^{mar}} - A_C e^{-j\omega_d \tau_c^{mar}} - A_E e^{-j\omega_d \tau_e^{mar}})=0 \quad (19)$$

where j denotes a symbol of imaginary number, $\omega_d$ denotes an amplitude of an imaginary part of a rightmost characteristic value of the cyber-physical power systems under distributed control in the marginally stable state, $\tau_m^{mar}$, $\tau_c^{mar}$, $\tau_e^{mar}$ respectively denote a boundary for the measurement time delay, a boundary for the communication time delay and a boundary for the control time delay.

2-3-3) The marginally stable characteristic equation with unified time delay is established.

$$\det(j\omega_d I - A_0 - A_M e^{-j\theta_d d_m} - A_C e^{-j\theta_d d_c} - A_E e^{-j\theta_d d_e})=0 \quad (20)$$

where $\theta_d$ denotes the unified time delay and is a scalar, $\omega_d \tau_m^{mar}$, $\omega_d \tau_c^{mar}$, $\omega_d \tau_e^{mar}$ are respectively equal to $\theta_d d_m$, $\theta_d d_c$, $\theta_d d_e$.

3) A stable boundary for time delay of the cyber-physical power systems under distributed control is solved. The block specifically includes the following.

3-1) A direction counter is set to be p=1 and a total number of the directions is set to be P (the greater the total number of the directions P the higher accuracy of the stable region for time delay, the smoother the boundary of the obtained stable region), and a direction corresponding to p=1 is taken as a present time delay direction.

3-2) Initialization is performed.

The normalized time delay direction vector d corresponding to the present time delay direction is determined (the greater a difference between the vectors d set in different directions, the higher the accuracy of the obtained stable region). A minimum unified time delay is set to be $\theta_{min}=0$, and a maximum unified time delay is set to be $\theta_{max}=\min(2\pi/d_m, 2\pi/d_c, 2\pi/d_e)$. An outer iteration unified time delay is set to be $\tilde{\theta}=\theta_{min}$, and an inner iteration unified time delay is set to be $\theta=\theta_{min}$. A convergence threshold $\varepsilon$ (a same threshold may be taken in all directions) is set and an iteration counter is set to be k=1. The number N of intervals for time delay is selected (that is, for the intervals at which the time delay is divided, the larger the number N, the more accurate, the smaller the number N, the faster a speed of calculation; the value of the number N in respective directions may be the same), and the interval for time delay is set as $\Delta\theta=(\theta_{max}-\theta_{min})/N$.

3-3) A minimum unstable time delay of the present time delay direction is determined. The block specifically includes the following.

3-3-1) It is determined whether k is less than N. In response to k being less than N, go to block 3-3-2). Otherwise, it is determined that all points in this direction are within the stable region of the systems, and a maximum value in a coordinate range of the present time delay direction is taken as a stable boundary for time delay in the present time delay direction, and then enter block 3-4-4).

3-3-2) $\theta_d$ in Formula (6) is set to be $\tilde{\theta}$, and Formula (6) is solved to obtain the rightmost characteristic value of the interval (that is, a characteristic value having a largest real part obtained by solving the characteristic equation at this time) $\tilde{\lambda}_r$.

3-3-3) It is determined whether a real part of $\tilde{\lambda}_r$ being less than 0. In response to the real part of $\tilde{\lambda}_r$ being less than 0, $\tilde{\theta}=\tilde{\theta}+\Delta\theta$, k=k+1 are set, and then return to block 3-3-1); otherwise, $\theta_{max}=\tilde{\theta}$ is set, and then enter block 3-4).

3-4) The stable boundary $(\tau_m^{mar}, \tau_e^{mar}, \tau_c^{mar})$ for time delay in the present time delay direction is solved.

3-4-1) $\theta_d$ in Formula (6) is set to be $\theta$, and Formula (6) is solved to obtain a critical characteristic value (that is, a characteristic value having a largest real part obtained by solving the characteristic equation at this time) $\lambda_r$.

3-4-2) It is determined whether a real part of the critical characteristic value $\lambda_r$ being less than the convergence threshold $\varepsilon$. In response to the real part of the critical characteristic value $\tilde{\lambda}_r$ being less than the convergence threshold $\varepsilon$, go to block 3-4-3); otherwise, go to block 3-4-4).

3-4-3) $\theta_d=\theta$, $\omega_d=\mathrm{Im}(\lambda_r)$ are set, where $\mathrm{Im}(\lambda_r)$ denotes an amplitude of an imaginary part of $\lambda_r$.

The stable boundary for time delay in the present time delay direction is solved.

$$(\tau_m^{mar}, \tau_e^{mar}, \tau_c^{mar})=(\theta_d/\omega_d)d \qquad (21)$$

Solving of the stable boundary for time delay in the present time delay direction is completed.

3-4-4) It is determined whether p is less than P. In response to p being less than P, p=p+1 is set, and the present time delay direction is updated and then return to block 3-2); otherwise, solving of the stable boundaries for time delays in all time delay directions is completed, and go to block 4).

3-4-5) It is determined whether the real part of $\lambda_r$ being less 0. In response to the real part of $\lambda_r$ being less 0, $\theta_{min}=\theta$ is set, and $\theta=(\theta_{min}+\theta_{max})/2$ is updated; otherwise, $\theta_{max}=\theta$ is set, and $\theta=(\theta_{min}+\theta_{max})/2$ is updated.

Then return block 3-4-1).

4) The stable region is determined.

The stable boundaries $(\tau_m^{mar}, \tau_e^{mar}, \tau_c^{mar})$ for time delays in all time delay directions are connected, and an inside of a high-dimensional polyhedron enclosed by the stable boundaries is the stable region for time delays of the cyber-physical power systems under distributed control with multiple time delays.

With obtaining the stable domain for time delays, the present disclosure may effectively guide communication architecture design of the cyber-physical power systems under distributed control. Ranges within which the measurement time delay, the communication time delay and the control delay are limited to ensure the systems to be sable may be determined according to the stable domain for time delays. In other words, when the measurement time delay, the communication time delay and control time delay are within the obtained stable domain, the systems may have better stability under small disturbances.

What is claimed is:

1. A stable region determining method for distributed cyber-physical power systems with multiple time delays, comprising:
   first establishing a state space expression of the cyber-physical power systems under distributed control with multiple time delays;
   converting the state space expression to frequency domain through Laplace transform to obtain a characteristic equation for multiple time delays of the cyber-physical power systems under distributed control, and establishing a marginally stable characteristic equation with unified time delay to obtaining a marginally stable characteristic equation for multiple time delays of the cyber-physical power systems under distributed control with unified time delay;
   in each time delay direction, solving a stable boundary for time delay of the cyber-physical power systems under distributed control;
   connecting the stable boundaries for time delays in all time delay directions, and finally generating a stable domain for time delays of the cyber-physical power systems under distributed control with multiple time delays;
   wherein the method further comprising:
   1) establishing the state space expression of the cyber-physical power systems under distributed control with multiple time delays:

$$\dot{x}(t)=A_0 x(t)+A_M x(t-\tau_m)+A_C x(t-\tau_c)+A_E x(t-\tau_e) \qquad (1)$$

where x(t) denotes a state variable of the cyber-physical power systems at time point t, $\dot{x}(t)$ denotes a differential variable of x(t), $x(t-\tau_m)$ denotes a state variable of the cyber-physical power systems with measurement time delay at time point $t-\tau_m$, $x(t-\tau_c)$ denotes a state variable of the cyber-physical power systems with communication time delay at time point $t-\tau_c$, $x(t-\tau_e)$ denotes a state variable of the cyber-physical power systems with control time delay at time point $t-\tau_e$, $T_m$ denotes the measurement time delay of the distributed control of a cyber side, $\tau_c$ denotes the communication time delay of the distributed control of the cyber side, $\tau_e$ denotes the control time delay of the distributed control of the cyber side, $A_O$ denotes a state transition matrix of the cyber-physical power systems in a normal state, $A_M$ denotes a transition matrix of the variable of the measurement time delay of the cyber-physical power systems, $A_C$ denotes a transition matrix of the variable of the communication time delay of the cyber-physical power systems, $A_E$ denotes a transition matrix of the variable of the control time delay of the cyber-physical power systems;

2) establishing the marginally stable characteristic equation for multiple time delays of the cyber-physical power systems under distributed control, which comprises:

2.1) solving Laplace form of Formula (1):

$$sX=A_0 X+A_M X e^{-s\tau_m}+A_C X e^{-s\tau_c}+A_E X e^{-s\tau_e} \qquad (2)$$

where s denotes a Laplace operator, X denotes x(t) in the frequency domain, e denotes a natural exponential;

2.2) establishing the characteristic equation for multiple time delays of the cyber-physical power systems under distributed control:

$$\det(\lambda I-A_0-A_M e^{-\lambda\tau_m}-A_C e^{-\lambda\tau_c}-A_E e^{-\lambda\tau_e})=0 \qquad (3)$$

where det denotes the characteristic equation, $\lambda$ denotes a characteristic value of the characteristic equation, I denotes an identity matrix having a same dimension as $A_0$; and 2.3) establishing the marginally stable characteristic equation with unified time delay of the cyber-physical power systems under distributed control, which comprises:
  2-3-1) establishing an expression of a normalized time delay direction vector, which satisfies:

$$d=(\tau_m, \tau_e, \tau_c)/\|(\tau_m, \tau_e, \tau_c)\|=(d_m, d_e, d_c) \quad (4)$$

where $\|\cdot\|$ denotes 2 norm, $d_m$ denotes a proportion of the measurement time delay in the direction vector, $d_e$ denotes a proportion of the control time delay in the direction vector, $d_c$ denotes a proportion of the communication time delay in the direction vector;
  2-3-2) constructing the marginally stable characteristic equation by substituting $\lambda$ in Formula (3) with $j\omega_d$:

$$\det(j\omega_d I - A_0 - A_M e^{-j\omega_d \tau_m^{mar}} - A_C e^{-j\omega_d \tau_c^{mar}} - A_E e^{-j\omega_d \tau_e^{mar}}) = 0 \quad (5)$$

where j denotes a symbol of imaginary number, $\omega_d$ denotes an amplitude of an imaginary part of a rightmost characteristic value of the cyber-physical power systems under distributed control in the marginally stable state, $\tau_m^{mar}$, $\tau_c^{mar}$, $\tau_e^{mar}$ respectively denote a boundary for the measurement time delay, a boundary for the communication time delay and a boundary for the control time delay; and
  2-3-3) establishing the marginally stable characteristic equation with unified time delay:

$$\det(j\omega_d I - A_0 - A_M e^{-j\theta_d d_m} - A_C e^{-j\theta_d d_c} - A_E e^{-j\theta_d d_e}) = 0 \quad (6)$$

where $\theta_d$ denotes the unified time delay, $\omega_d \tau_m^{mar}$ is equal to $\theta_d d_m$, $\omega_d \tau_c^{mar}$ is equal to $\theta_d d_c$, $\omega_d \tau_e^{mar}$ is equal to $\theta_d d_e$;

3) solving a stable boundary for time delay of the cyber-physical power systems under distributed control, which comprises:
  3-1) setting a direction counter to be p=1 and a total number of the directions to be P, and taking a direction corresponding to p=1 as a present time delay direction;
  3-2) performing initialization, which comprises: determining the normalized time delay direction vector d corresponding to the present time delay direction, setting a minimum unified time delay to be $\theta_{min}=0$, setting a maximum unified time delay to be $\theta_{max}=\min(2\pi/d_m, 2\pi/d_c, 2\pi/d_e)$, setting an outer iteration unified time delay to be $\bar{\theta}=\theta_{min}$, setting an inner iteration unified time delay to be $\theta=\theta_{min}$, setting a convergence threshold $\varepsilon$ and an iteration counter as k=1, selecting the number N of intervals for time delay and the interval for time delay as $\Delta\theta=(\theta_{max}-\theta_{min})/N$;
  3-3) determining a minimum unstable time delay of the present time delay direction, which comprises:
    3-3-1) determining whether k is less than N; going to block 3-3-2) in response to k being less than N; otherwise, determining that all points in this direction are within the stable region of the systems, and taking a maximum value in a coordinate range of the present time delay direction as a stable boundary for time delay in the present time delay direction, and then entering block 3-4-4);
    3-3-2) setting $\theta_d$ in Formula (6) to be $\bar{\theta}$, and solving Formula (6) to obtain the rightmost characteristic value of the interval $\tilde{\lambda}_r$; and
    3-3-3) determining whether a real part of $\tilde{\lambda}_r$ being less than 0, in response to the real part of $\tilde{\lambda}_r$ being less than 0, setting $\bar{\theta}=\bar{\theta}+\Delta\theta$, k=k+1, and then returning to block 3-3-1); otherwise, setting $\theta_{max}=\bar{\theta}$, and then entering block 3-4);
  3-4) solving the stable boundary $(\tau_m^{mar}, \tau_e^{mar}, \tau_c^{mar})$ for time delay in the present time delay direction, which comprises:
    3-4-1) setting $\theta_d$ in Formula (6) to be $\theta$, and solving Formula (6) to obtain a critical characteristic value $\lambda_r$;
    3-4-2) determining whether a real part of the critical characteristic value $\lambda_r$ being less than the convergence threshold $\varepsilon$, in response to the real part of the critical characteristic value $\tilde{\lambda}_r$ being less than the convergence threshold $\varepsilon$, going to block 3-4-3); otherwise, going to block 3-4-4);
    3-4-3) setting $\theta_d=\theta$, $\omega_d=\text{Im}(\lambda_r)$, where $\text{Im}(\lambda_r)$ denotes an amplitude of an imaginary part of $\lambda_r$;
    solving the stable boundary for time delay in the present time delay direction as:

$$(\tau_m^{mar}, \tau_e^{mar}, \tau_c^{mar})=(\theta_d/\omega_d)d \quad (7)$$

completing solving of the stable boundary for time delay in the present time delay direction;
    3-4-4) determining whether p is less than P, in response to p being less than P setting p=p+1, and updating the present time delay direction and then returning to block 3-2); otherwise, completing solving of the stable boundaries for time delays in all time delay directions, and going to block 4);
    3-4-5) determining whether the real part of $\lambda_r$ being less 0, in response to the real part of $\lambda_r$ being less 0, setting $\theta_{min}=\theta$, and updating $\theta=(\theta_{min}+\theta_{max})/2$; otherwise, setting $\theta_{max}=\theta$, and updating $\theta=(9\theta_{min}+\theta_{max})/2$;
    then returning block 3-4-1);
4) determining the stable region;
wherein the stable boundaries $(\tau_m^{mar}, \tau_e^{mar}, \tau_c^{mar})$ for time delays in all time delay directions are connected, and an inside of a high-dimensional polyhedron enclosed by the stable boundaries is the stable region for time delays of the cyber-physical power systems under distributed control with multiple time delays.

* * * * *